Feb. 26, 1963   J. F. STEPHENS   3,078,880
FOLDING INSULATED DUCT
Filed May 11, 1953   2 Sheets-Sheet 1
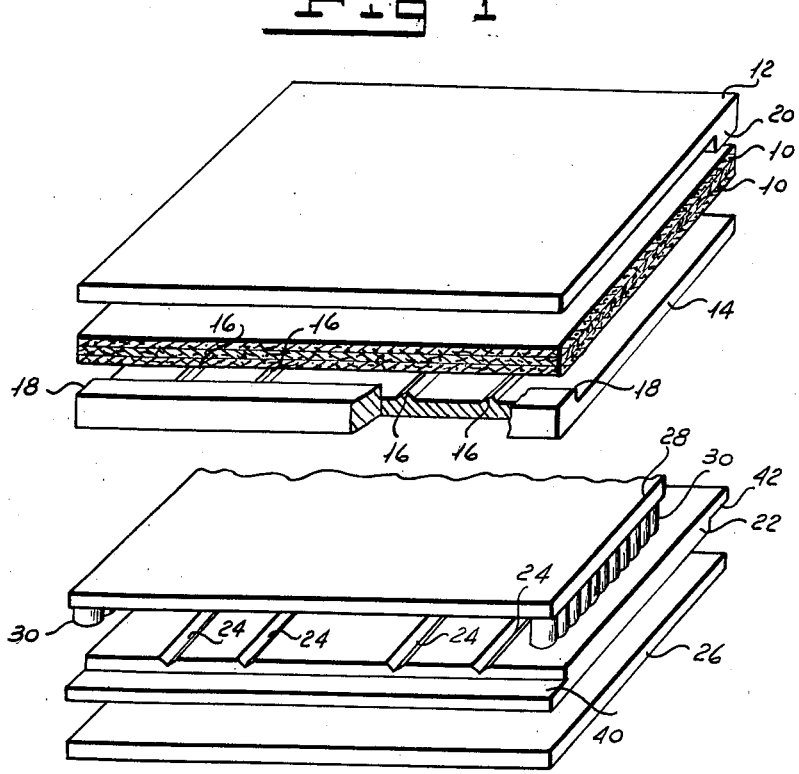
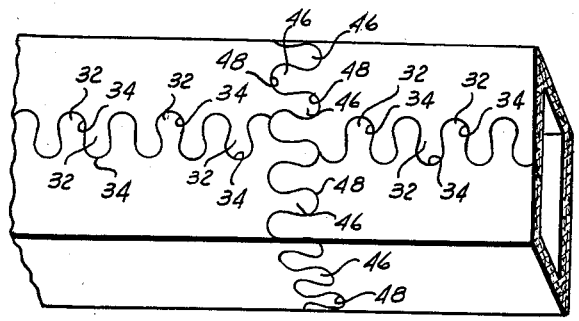
INVENTOR.
JOSEPH F. STEPHENS
BY Henry L. Shenier
ATTORNEY Feb. 26, 1963    J. F. STEPHENS    3,078,880
FOLDING INSULATED DUCT
Filed May 11, 1953    2 Sheets-Sheet 2
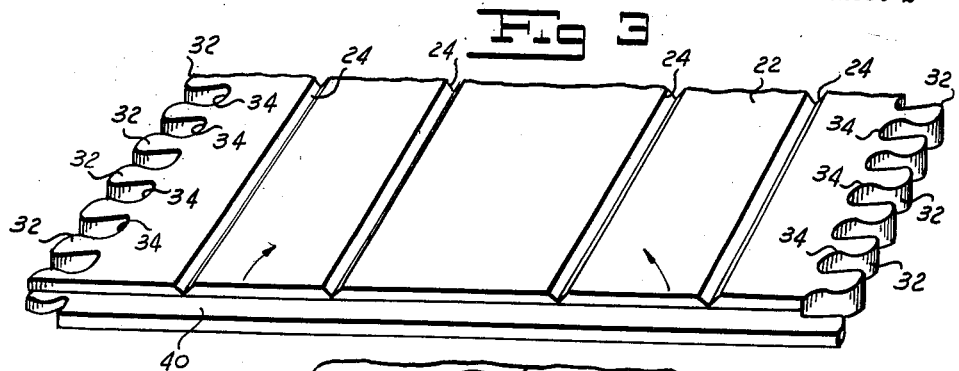
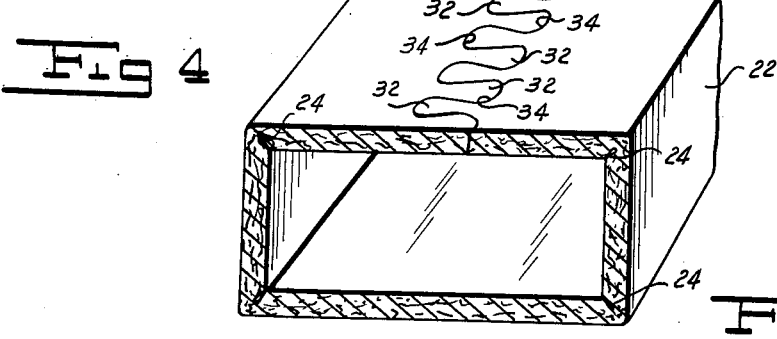
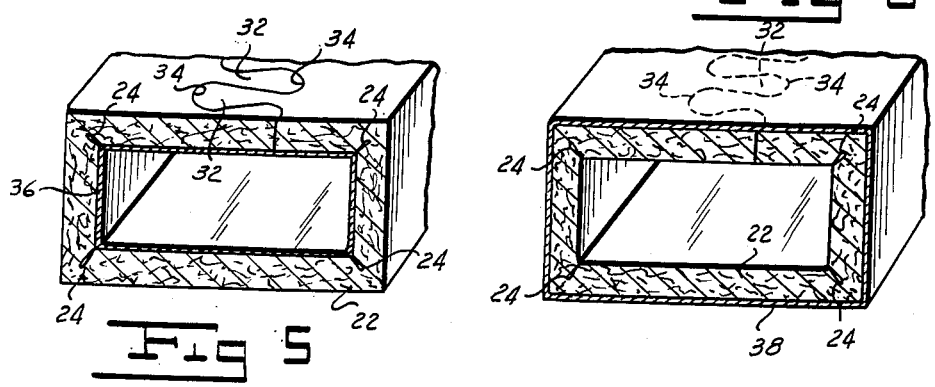
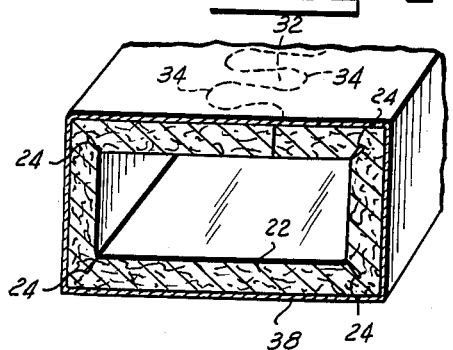
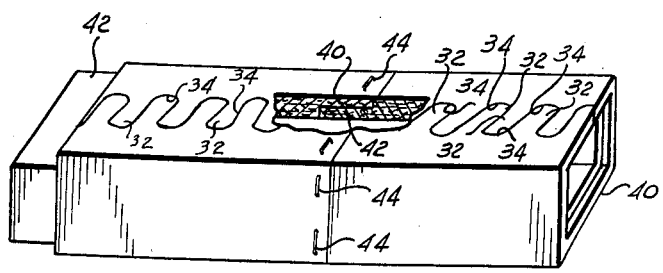
INVENTOR.
JOSEPH F. STEPHENS
BY
ATTORNEY

United States Patent Office 3,078,880
Patented Feb. 26, 1963

3,078,880
FOLDING INSULATED DUCT
Joseph F. Stephens, Kansas City, Mo., assignor to Gustin-Bacon Manufacturing Co., a corporation of Delaware
Filed May 11, 1953, Ser. No. 353,963
5 Claims. (Cl. 138—141)

My invention relates to insulated ducts and more particularly to an improved insulated duct which is formed from a folding molded sheet of insulating material and which is provided with interengaging means for joining the edges of the sheet to complete the duct.

Insulated ducts have numerous and varied applications which include heating systems, air conditioners, and the like. A minimum structural requirement for insulating ducts in such applications is that they be sufficiently strong to retain their cross-sectional shape. When such ducts are employed in heating systems such as peripheral heating systems in which the duct is imbedded, for example, in a poured concrete floor, the duct must have sufficient strength to support the weight of wet concrete thereon when the floor is being poured. To provide sufficient structural strength in insulating ducts of the prior art, the ducts are formed of sheet metal to which insulation is applied. It will be appreciated that a duct manufacturer must prefabricate the duct to its desired cross-sectional shape before delivering the duct to the consumer. As a result, the ducts occupy a large amount of shipping space and are consequently expensive to ship. In the copending application of Joseph F. Stephens and Glenn W. Kerr, Serial No. 336,712, filed February 13, 1953, now Patent No. 2,790,464, an Insulated Duct and Method of Making the Same is disclosed, which duct is formed of a material having sufficient structural strength such that it will retain its cross-sectional shape when acted on by an external force. I have invented an improved insulated duct which may be manufactured as a molded sheet and folded to form a completed duct. My improved insulated duct may, consequently, be manufactured and shipped flat and folded into final form at the location in which the duct is to be installed. Moreover, I have provided the molded sheet from which the duct is formed with interlocking means whereby the edges of the sheet are joined to complete the duct. Means independent of the sheet of insulating material could be employed for joining the edges of the sheet together to complete the duct. I have formed my joining means for engaging the edges of the sheet from the insulating material from which the sheet is formed, since independent fastening means may deteriorate more rapidly than the insulating material itself, and their use and installation are more time consuming and expensive. In addition I may provide my duct with means whereby a number of lengths of duct may be joined in end-to-end relationship.

One object of my invention is to provide an improved insulated duct which may be formed as a flat sheet and folded to complete the duct at the location where the duct is to be installed.

Another object of my invention is to provide an improved insulated duct which is manufactured as a molded sheet of insulating material and which sheet has interlocking means formed along a pair of edges whereby the edges of the sheet may be joined and maintained in contact to complete the duct.

A further object of my invention is to provide a folding insulated duct formed with joining means on its ends whereby a number of sections of duct may be associated in end-to-end relationship to form an elongated conduit.

A still further object of my invention is to provide a folding insulated duct wherein the structural strength of the duct is provided by the insultaing material of which the duct is formed so that the duct retains its dimensional stability under the action of an external force.

Still another object of my invention is to provide an improved insulated duct which is manufactured as a molded sheet having interlocking means formed on opposed edges, which interlocking means are formed of the insulating material from which the duct is made.

Yet another object of my invention is to provide a folding insulated duct which is formed as a sheet of insulating material so that the duct may be shipped in flat form.

Other and further objects of my invention will appear from the following description.

In general my invention contemplates the provision of an improved insulated duct which is formed as a molded sheet and which sheet may be bent along preformed grooves to form a completed duct. I place a cohesive mat or bat comprising a number of layers of appropriate insulating material in a particular die and compress it so that the resultant sheet is scored with grooves running lengthwise of the sheet. The insulating material of which my duct is formed must have sufficient structural strength such that it will retain its cross-sectional shape when formed as a duct and yet be sufficiently resilient so that the molded sheet may be bent along its grooves without breaking or delaminating the insulating material. After the molded, scored or grooved sheet has been cured, I die-cut interlocking means along opposed edges of the sheet in the direction of the length of the grooves. To form the sheet into a completed duct, I bend the sheet along the furrows or grooves and engage the interlocking means to complete the duct. If desired, I may also form joining means on the ends of the sheet so that a number of sections of duct may be joined in end-to-end relationship to form an elongated conduit. An inner liner, which may be a foil or film of resinous material or the like, may be provided to render the duct impervious to the passage of air or to smooth out the interior of the duct and reduce the resistance of air flow within the duct. I may provide the outer surface of the duct with a coating or jacket which may be molten asphalt, bituminous material or a metal sheet or foil for sealing the duct against the escape of air or to provide a water vapor or moisture barrier so that my duct may be used for refrigeration or air conditioning purposes. It will be appreciated that such an exterior covering may be employed to present a more pleasing appearance in the event the duct is in an exposed location.

In the accompanying drawings which form part of the instant specification and which are to be read in conjunction therewith and in which like reference numerals are used to indicate like parts in the various views:

FIGURE 1 is a perspective view with a part broken away showing a mat or bat of insulating material in relation to a die for molding a sheet of insulating material from which my improved duct is to be formed.

FIGURE 2 is a perspective view with a part broken away of a molded sheet of insulating material in relation to a clutter for forming the interlocking joining means along the longitudinal edges of the sheet.

FIGURE 3 is a perspective view of a portion of a completed sheet of insulating material from which my improved duct may be formed showing one means for joining sections of duct in end-to-end relationship.

FIGURE 4 is a perspective view of a portion of my improved insulated duct when the duct has been completely formed and is to be used in a location where it is imbedded in material such as concrete where no vapor barrier is necessary.

FIGURE 5 is a view similar to FIGURE 4 but on a reduced scale showing my improved duct provided with an interior liner.

FIGURE 6 is a view similar to FIGURE 4 on a reduced scale showing my improved duct provided with an exterior covering.

FIGURE 7 is a perspective view on a reduced scale of a pair of sections of my improved insulated duct showing one form of joining the sections in end-to-end relationship to form an elongated conduit.

FIGURE 8 is a perspective view on a reduced scale of a pair of sections of my improved duct showing an alternate means for joining the sections in end-to-end relation.

More particularly referring now to the drawings, I form my improved duct from a stack of mats or bats 10 of insulating material. The insulating material forming the mats 10 may be any suitable insulating material which has sufficient structural strength to retain its shape after forming and yet which is sufficiently resilient so that it can be scored and bent to form a duct without breaking, crumbling, crushing or delaminating. Preferably the mats 10 are formed of glass fibers bonded with a binder of heat reactive resin or the like and formed in the manner disclosed in the copending application, Serial No. 336,712, hereinabove referred to. The stack of bats or mats 10 is laminated and the number of laminations is controlled by the desired density or wall thickness of the finished duct. I place this stack between an upper 12 and a lower 14 die plate. The lower die plate 14 has a number of thin ridges 16 running along its length and spaced from one another by varying predetermined distances. The space between adjacent ridges 16 is dictated by the dimensions of the finished duct. For example, the distance between the respective apexes of the two center ridges corresponds to the width of the finished duct, and the distance between a pair of adjacent ridges at either side of the plate 14, as viewed in FIGURE 1, corresponds to the height of the finished duct. While only four ridges 16 have been shown such as will form a rectangular duct, it will be understood that any desired shape duct may be formed by employing appropriately spaced ridges 16. I have shown the lower die plate 14 as being formed with an upstanding boss 18 running across the front thereof, as viewed in FIGURE 1, and the coacting die plate 12 is formed with a depending boss 20 running across its width at the back thereof, as viewed in FIGURE 1. These bosses form joining means for connecting sections of duct in end-to-end relationship, as will be explained hereinafter. The upper and lower die plates are forced toward one another in a manner well known in the art, whereby the stack of mats 10 is formed into a sheet of molded insulating material 22. The ridges 16 are of a height at their apexes such that they score the sheet 22 to a depth which is approximately half the thickness of the finished sheet and thereby form grooves or furrows 24 along the length of the sheet. The grooves 24 may be formed of a pair of 45-degree bevels such that when the sheet is bent along the groove to form a duct, the beveled surfaces register and the grooves disappear in the inside of a corner of the duct. The molded stack is cured in any appropriate manner depending on its composition. If the material of the mats includes a heat reactive binder, heat may be employed to cure the stack.

After the freshly molded or green sheet of insulating material 22 has been cured, as for example, in the manner disclosed in the copending application, Serial No. 336,712, referred to above, it is placed in a cutting die including a base plate 26 and a cutter plate 28 as shown in FIGURE 2. For purposes of clarity, sheet 22 is illustrated in FIGURE 2 in a position where it has been turned over from the position in which it was formed in the die illustrated in FIGURE 1. Plate 28 is provided with cutters 30 along its length at both sides. When cutter plate 28 is moved toward base plate 26, cutters 30 cut through the longitudinal edges of the sheet 22 to form interlocking means. The cutters 30 may be shaped so as to provide any desired configuration of interlocking means, but we have selected them, for convenience, to cut flared tongues 32 and complementary intervening notches 34 along the sides of sheet 22, as can be seen by reference to FIGURE 3. The cutters 30 along one edge of cutting plate 28 must, of course, be staggered relative to the cutters depending from the other edge, in order that the flared tongues 32 on one edge of sheet 22 will register with corresponding notches 34 in the other edge of the sheet 22 when the sheet is bent to form the duct. Alternatively, I could employ cutters 30 of a shape to cut any type interlocking means such, for example, as dovetails and complementary intervening grooves, or I could form a pair of complementary steps on the respective longitudinal edges of the sheet and use staples to hold the steps together and provide a lap joint, as will be readily understood by those skilled in the art. I have selected the flared tongue and intervening notch connection as the preferred form, however, since the cut will disappear smoothly when the tongues 32 on each of the edges are engaged with the notches 34 in the other edges. That is, the surface of the duct along the cut will appear smooth and continuous. In the event that an alternate type interlocking means, such as a dovetail and notch connection, having sharp corners were employed, there would be substantially more interference between the edges when an attempt was made to join the interlocking means.

When a sheet of molded insulating material has been formed in the manner described, a duct may be made by bending the sheet along each of the scores or grooves 24 and joining the interlocking engaging means 32 and 34. A completed duct is illustrated in FIGURE 4 when the duct is to be imbedded in a material which renders it impervious to the passage of air. It will be noted that in this completed form, the beveled surfaces forming the scores or grooves 24 register with one another and the grooves 24 disappear into the corners of the completed duct. The seam formed by the joining means has been illustrated in this figure, but it will be appreciated that in actual use the cut will fade out smoothly so that the upper surface of the duct appears as a smooth continuous surface.

In the event the duct is to be used in a location where it will not be imbedded in a material which will prevent the escape of air through the walls, some means must be provided for sealing the duct walls. Such means are illustrated in FIGURES 5 and 6.

In FIGURE 5 I have shown my improved duct in use with an interior liner 36. Such an interior liner 36 is necessary to render the duct impervious to the passage of air through the wall thereof when the duct is not imbedded, or to smooth out the interior of the duct and thereby reduce the resistance to air flow. Such a lining may be aluminum foil, a plastic, a film of resinous material or a thin film of material applied by a metalizing gun. Such liner may also be applied by means of a plug pulled through the duct, by rollers or any similar means.

In FIGURE 6 I have shown my improved duct with a coating or jacket 38 on its outside surface. This coating may be a fireproof or self-extinguishing coating. It may also serve to seal the duct against escape of air or provide a water vapor or moisture barrier so that the duct can be used for refrigeration or air conditioning purposes. The coating may be formed from molten asphalt or bituminous material used with muslin or it may be a metal jacket. The coating may be applied by spraying or doctoring the material on with rollers. Of course, if the coating material or liner material warrants suitable adhesives may be used to apply the coating. If it is desired to enhance the appearance of the duct in the event it is located in an exposed position, the jacket may be appropriate decorative material.

I have also provided means for joining a number of sections of my improved duct in end-to-end relationship to provide an elongated conduit. For example, if I provide my molding die with bosses 18 and 20, as illustrated in FIGURE 1, I may mold corresponding steps 40 and 42, respectively, in the ends of a sheet 22 making up a section of duct. The bosses 18 and 20 are adapted to compress sheet 22 oppositely at either end to a depth equal to approximately half the thickness of the sheet. It will be appreciated that when a sheet 22 is bent to form a section of duct, the section will have an interior step 40 at one end and an exterior step 42 at the other end. A pair of sections can be joined together by telescoping the step 42 to form a lap joint. This form for joining a pair of sections in end-to-end relationship is illustrated in FIGURE 7. If there is any force on a pair of adjacent sections which would tend to separate the steps 40 and 42 longitudinally, appropriate securing means, such as staples 44, may be used to secure the steps together.

Another means by which a pair of sections can be joined in end-to-end relationship is illustrated in FIGURE 8. In this form, instead of providing laps or steps 40 and 42 at the respective ends of the sheet 22, I cut interlocking means at the ends. This may be accomplished in the cutting stage of forming sheet 22, which is illustrated in FIGURE 2. I may dispose cutters similar to cutters 30 at the ends of plate 28 so that when the cutting plate 28 is moved toward base plate 26, flared tongues 46 and complementary intervening notches 48 are formed at the ends. Thereby a pair of adjacent sections can be joined in end-to-end relationship in the manner shown in FIGURE 8. It will be appreciated that the material of which my duct is formed is sufficiently resilient that tongues 46 may be bent relative to the body of the duct, if any difficulty is encountered in engaging them with the notches, without breaking or delaminating the insulating material. Instead of forming flared tongues 46 and corresponding notches 48, I may use any other type interlocking means, such as dovetails and intervening notches or the like, but have selected the form shown as the preferred type of interlocking means. It is to be understood also that I can provide the steps 40 and 42 with corresponding interlocking means by use of appropriate dies to provide an engagement therebetween.

As is the case with the cutters 30 for forming the interlocking means along the longitudinal edges of a sheet 22, cutters for forming the interlocking means such as tongues 46 and notches 48 at the ends of a sheet must be staggered so that a tongue on one end of the sheet will correspond to a groove on the other end. If the cutters are thus staggered, the tongues 46 on the edge of one section will register with the corresponding grooves 48 in an adjacent section.

In use, my improved duct is manufactured in substantially the form illustrated in FIGURE 3. It may be provided with longitudinal interlocking means different from the tongues 32 and grooves 34 and may employ steps 40 and 42 for joining adjacent sections of interlocking means for joining sections as desired. The number of and spacing between adjacent scores 24 are dictated by the dimensions of the completed duct. The ducts are transported to the locations in which they are to be used in the flat form shown in FIGURE 3. To install the duct, the sheet 22 is first bent along the grooves or scores 24 so that the beveled surfaces forming the grooves register and the grooves disappear into the interior corners of the duct. The tongues 32 along each side of the sheet 22 are engaged with the corresponding notches 34 in the opposite edge to form the completed duct, as shown in FIGURE 4. The line of juncture between tongues 32 and grooves 34 will disappear so that the surface of the duct appears smooth and continuous. If it is desired, an inner liner 36 may be provided or applied in the duct in the manner described. Similarly, if necessary or desirable, an exterior coating or jacket 38 may be provided or applied to the assembled duct. To join a pair of sections of duct in end-to-end relationship, a step 42 of one section may be inserted within a step or lip 40 in an adjacent section and the steps secured together by appropriate means such as staples 44. Alternately, the duct may be formed with tongues 46 and corresponding notches 48 at each end and a pair of sections joined in end-to-end relationship by interlocking the tongues and grooves or any other suitable interlocking means provided.

It will be seen that I have accomplished the objects of my invention. I have provided an improved insulated duct which can be manufactured and shipped as a flat sheet. My improved duct is formed of an insulating material which has sufficient structural strength to retain its cross-sectional shape and yet which has sufficient resiliency that it can be bent along scores or grooves without crumbling, breaking or delaminating the insulating material. My duct can be shipped flat and rapidly and expeditiously formed into a completed duct by bending along appropriate grooves. The sheet from which a duct is formed has joining means formed along its longitudinal edges for completing the duct. The joining means are formed of the insulating material itself and thereby will last for the life of the insulation. In addition, I have provided means for joining a number of sections of duct in end-to-end relationship.

It will be understood that certain features and subcombinations are of utility and may be employed without reference to other features and subcombinations. This is contemplated and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A folding insulated duct comprising an integral sheet of a molded mat of fibers bonded with a heat-reactive resin and formed with a plurality of furrows extending in the direction of the length of the sheet, the separation between said furrows being determined by the dimensions of said duct, said sheet being compressed to a predetermined density in the area between said furrows and to a density greater than said predetermined density in the area of said furrows, said densities being retained by said heat-reactive resin in its cured state, said sheet adapted to be bent along said furrows to form a completed duct.

2. A folding insulated duct comprising an integral sheet of a molded mat of fibrous bonded with a heat-reactive resin and formed with a plurality of furrows extending in the direction of the length of the sheet, the separation between said furrows being determined by the dimensions of said duct, said sheet being compressed to a predetermined density in the area between said furrows and to a density greater than said predetermined density in the area of said furrows, said densities being retained by said heat-reactive resin in its cured state, said sheet adapted to be bent along said furrows to form a completed duct, said sheet being formed with complementary means along its transverse opposed edges for joining a plurality of ducts in end-to-end relationship.

3. A folding insulated duct comprising an integral sheet of a molded mat of fibers bonded with a heat-reactive resin and formed with a plurality of furrows extending in the direction of the length of the sheet, the separation between said furrows being determined by the dimensions of said duct, said sheet being compressed to a predetermined density in the area between said furrows and to a density greater than said predetermined density in the area of said furrows, said densities being retained by said heat-reactive resin in its cured state, said sheet adapted to be bent along said furrows to form a completed duct, said sheet being formed along its opposed longitudinal edges with means for joining said edges to each other when the sheet is bent to form a duct.

4. A folding insulated duct comprising an integral sheet of a molded mat of fibers bonded with a heat-reactive resin and formed with a plurality of furrows extending in the direction of the length of the sheet, the separation between said furrows being determined by the dimensions of said duct, said sheet being compressed to a predetermined density in the area between said furrows and to a density greater than said predetermined density in the area of said furrows, said densities being retained by said heat-reactive resin in its cured state, said sheet adapted to be bent along said furrows to form a completed duct, and an interior liner for said duct to render the duct walls impervious to the passage of air.

5. A folding insulated duct comprising an integral sheet of a molded mat of fibers bonded with a heat-reactive resin and formed with a plurality of furrows extending in the direction of the length of the sheet, the separation between said furrows being determined by the dimensions of said duct, said sheet being compressed to a predetermined density in the area between said furrows and to a density greater than said predetermined density in the area of said furrows, said densities being retained by said heat-reactive resin in its cured state, said sheet adapted to be bent along said furrows to form a completed duct, and an exterior coating on said duct to form a water vapor barrier.

References Cited in the file of this patent

UNITED STATES PATENTS

| Number | Name | Date |
|---|---|---|
| 578,801 | Wilmot | Mar. 16, 1897 |
| 696,059 | Line | Mar. 25, 1902 |
| 1,198,554 | Jarvey | Sept. 19, 1916 |
| 1,449,409 | Hunt | Mar. 27, 1923 |
| 1,730,090 | O'Brien | Oct. 1, 1929 |
| 1,912,698 | Forsman | June 6, 1933 |
| 2,178,984 | Zimmerman | Nov. 7, 1939 |
| 2,226,523 | Peck | Dec. 24, 1940 |
| 2,348,284 | Dunleavey | May 9, 1944 |
| 2,378,272 | Whitaker | June 12, 1945 |
| 2,467,999 | Stephens | Apr. 19, 1949 |
| 2,594,838 | Alexander et al. | Apr. 29, 1952 |
| 2,604,984 | Apgar | July 29, 1952 |
| 2,644,602 | Ross | July 7, 1953 |